United States Patent [19]

Yasumi

[11] 4,454,657
[45] Jun. 19, 1984

[54] APERTURE SETTING DEVICE

[75] Inventor: Masaoki Yasumi, Akigawa, Japan

[73] Assignee: Japan Aviation Electronics Industry Limited, Tokyo, Japan

[21] Appl. No.: 361,649

[22] Filed: Mar. 25, 1982

Related U.S. Application Data

[62] Division of Ser. No. 172,305, Jul. 25, 1980, abandoned.

[51] Int. Cl.³ .................... G01B 5/00; B23P 19/00
[52] U.S. Cl. ..................... 33/180 R; 29/751
[58] Field of Search ............ 33/178 R, 180 R, 181 R, 33/DIG. 7; 29/751, 753

[56] References Cited

U.S. PATENT DOCUMENTS

| | | | |
|---|---|---|---|
| 1,576,346 | 3/1926 | Mendell | 33/178 R |
| 1,878,296 | 9/1932 | Schmidt et al. | 33/180 R |
| 2,638,676 | 5/1953 | Callahan | 33/180 R |
| 2,827,941 | 3/1958 | Stoltz | 29/753 |
| 3,325,885 | 6/1967 | Ziegler, Jr. et al. | 29/751 |
| 3,859,728 | 1/1975 | Shutt | 33/180 R |
| 4,041,766 | 8/1977 | Johnson et al. | 29/753 |

FOREIGN PATENT DOCUMENTS

| | | | |
|---|---|---|---|
| 87474 | 1/1958 | Netherlands | 33/1 B |

*Primary Examiner*—Richard R. Stearns
*Attorney, Agent, or Firm*—Pollock, Vande Sande & Priddy

[57] ABSTRACT

An aperture setting device for use in a drawing die, a chuck and so forth, in which at least three or more substantially triangular movable pieces are sequentially arranged in the form of a ring, an aperture is formed by one end portion of an inner side of each movable piece and the movable piece is movable along a side opposite its vertical angle on the side of the aperture, together with the other movable pieces. The movable pieces are disposed in a frame. By the movement of the movable pieces, the aperture can be varied in size without being changed in configuration.

7 Claims, 18 Drawing Figures

APERTURE SETTING DEVICE

This is a division of application Ser. No. 172,305, filed July 25, 1980, now abandoned.

BACKGROUND OF THE INVENTION

The present invention relates to an aperture setting device applicable, for example, to a drawing die, a chuck and so forth, and more particularly to an aperture setting device in which the size of a predetermined polygonal aperture can be changed, retaining the polygonal configuration.

Heretofore, there has been employed a guide device of a conical, unitary structure for guiding an electric wire or the like to a predetermined position. In the prior art, since it is difficult to change the size of the conical structure without introducing a gap between adjacent elements forming the conical structure, use is made of a guide device of a size corresponding to the thickness of each electric wire or the like to be guided. Also there has been employed a chuck of the type clamping an article with three or four clicks. In the conventional chuck of this kind, the article to be clamped may get between the clicks according to the size of the article, sometimes resulting in a state in which the axis of the chuck is not in agreement with the axis of the article. Accordingly, for example, machining of the article cannot immediately be carried out on the basis of the axis of the chuck in some cases.

In the past, there has not been put to practical use a device which is capable of changing with a simple arrangement, a polygonal aperture into various sizes continuously or stepwise, retaining it on the same axis. Such a device, if realized, would be of great ability when employed in such devices as a chuck, a press tool, an electric wire guide device, a drawing die, a control valve and so forth.

It is an object of the present invention to provide an aperture setting device which is capable of easily changing the size of a predetermined polygonal aperture with a simple arrangement.

SUMMARY OF THE INVENTION

In the aperture setting device of the present invention, use is made of a plurality of movable pieces each of which has a triangular section in a plane which includes an aperture and perpendicular to the axis thereof. When the vertices of the triangles of the movable pieces are brought into agreement with the aperture axis, the sum of the vertical angles of the triangles with respect to the vertices is 360°. The configurations of the movable pieces are selected so that, in the abovesaid state, a polygonal aperture is defined by the sides opposite the vertical angles of the triangles of the movable pieces. Drive means is provided for moving the movable pieces along the abovesaid opposite sides in the plane including the aperture.

DESCRIPTION OF THE PREFERRED EMBODIMENTS

Figure 1:
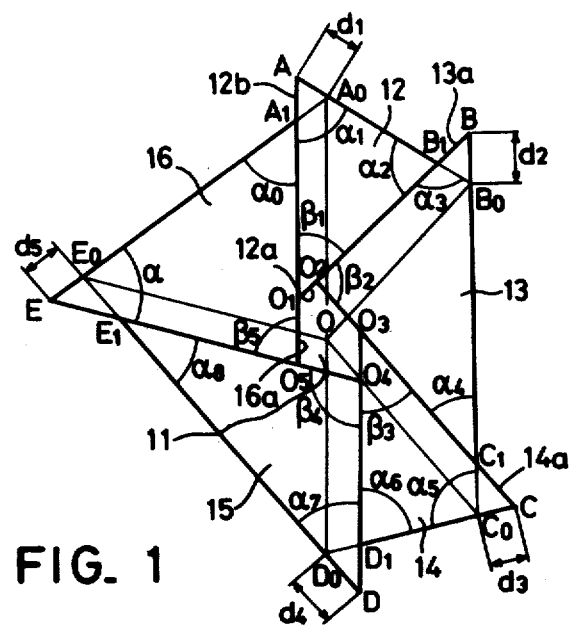
FIG. 1 is a diagram showing the general principles of the aperture setting device of the present invention.

Referring first to FIG. 1, the illustrated embodiment of the present invention is arranged so that an aperture 11 to be set (hereinafter referred to as the aperture) is defined by five movable triangular pieces 12 to 16. In this case, the movable piece 13 is disposed with one side 13a of its triangle held partly in agreement with one side 12a of the movable piece 12 forming one side of the pentagonal aperture area 11 but with one end of the piece 13 displaced outwardly relative to the area 11. The movable piece 14 is disposed so that its one side 14a partly lies along one side 13b forming one side of the area 11 but projects outwardly relative to the area 11. The other movable pieces are also likewise disposed one after another, and the movable piece 16 is disposed so that its one side 16a forming one side of the area 11 is in contact with one side 12b of the movable piece 12.

The movable pieces 12, 13, 14, 15 and 16 are arranged so that they are respectively movable, in a plane including the aperture 11, only along opposite sides $\overline{AB_1}$, $\overline{BC_1}$, $\overline{CD_1}$, $\overline{DE_1}$ and $\overline{EA_1}$ to their vertical angles $\beta_1$, $\beta_2$, $\beta_3$, $\beta_4$ and $\beta_5$ on the side of the aperture 11. These sides will hereinafter be referred to as bases. At extreme positions of the movable pieces 12 to 16 where they have been moved respectively along their bases to bring their vertices $0_1$, $0_2$, $0_3$, $0_4$ and $0_5$ to the center of the aperture 11, that is, its axis 0, the vertices $0_1$, $0_2$, $0_3$, $0_4$ and $0_5$ of the triangular movable pieces 12 to 16 coincide with the aperture axis 0. In this state, each end of the base of each of the five movable pieces 12 to 16 meets one end of the base of each of the adjoining movable pieces and their bases form a pentagon $A_0B_0C_0D_0E_0$. The sum of the vertical angles of the vertices $0_1$ to $0_5$ is 360° and the aperture 11 is completely covered by the movable pieces 12 to 16.

In the following description the triangular figures in the plane including the aperture 11 will be referred to as movable pieces unless otherwise specified. Let it be assumed that if one end A of the base of the movable part 12 is movable along the base from $A_0$ by a distance $d_1$, then one end B of the base of the movable piece 13, one end C of the base of the movable piece 14, one end D of the base of the movable piece 15 and one end E of the base of the movable piece 16 are respectively movable along the bases from $B_0$, $C_0$, $D_0$ and $E_0$ by distances $d_2$, $d_3$, $d_4$ and $d_5$. By moving the movable pieces 12 to 16 in the above way, it is possible to change the aperture into similar figures of various sizes.

Letting the base angles of the movable pieces 12 to 16 be represented by $\alpha_1\alpha_2$, $\alpha_3\alpha_4$, $\alpha_5\alpha_6$, $\alpha_7\alpha_8$ and $\alpha_9\alpha_{10}$, respectively, as shown in FIG. 1, the following expressions hold between these base angles and the distances $d_1$, $d_2$, $d_3$, $d_4$ and $d_5$:

$$d_2 = \frac{\sin\alpha_2}{\sin\alpha_3} \cdot d_1 \tag{1}$$

$$d_3 = \frac{\sin\alpha_4}{\sin\alpha_5} \cdot d_2 = \frac{\sin\alpha_4}{\sin\alpha_5} \cdot \frac{\sin\alpha_2}{\sin\alpha_3} \cdot d_1 \tag{2}$$

$$d_4 = \frac{\sin\alpha_6}{\sin\alpha_7} \cdot \frac{\sin\alpha_4}{\sin\alpha_5} \cdot \frac{\sin\alpha_2}{\sin\alpha_3} \cdot d_1 \tag{3}$$

$$d_5 = \frac{\sin\alpha_8}{\sin\alpha_9} \cdot \frac{\sin\alpha_6}{\sin\alpha_7} \cdot \frac{\sin\alpha_4}{\sin\alpha_5} \cdot \frac{\sin\alpha_2}{\sin\alpha_3} \cdot d_1 \tag{4}$$

Further, since $$d_5 = \frac{\sin\alpha_1}{\sin\alpha_{10}} \cdot d_1$$

$$\frac{\sin\alpha_2}{\sin\alpha_1} \cdot \frac{\sin\alpha_4}{\sin\alpha_3} \cdot \frac{\sin\alpha_6}{\sin\alpha_5} \cdot \frac{\sin\alpha_8}{\sin\alpha_7} \cdot \frac{\sin\alpha_{10}}{\sin\alpha_9} = 1 \tag{5}$$

Letting the vertical angles be represented by $\beta_1$, $\beta_2$, $\beta_3$, $\beta_4$ and $\beta_5$, respectively, the following expressions hold:

$$\alpha_{2i-1} + \alpha_{2i} + \beta_i = 180° \tag{6}$$

where $i = 1, 2, \ldots 5$, and $$\Sigma\beta_i = 360° \tag{7}$$

where $i = 1, 2, \ldots 5$.

In the structure of FIG. 1, it is necessary to satisfy the conditions (5), (6) and (7). The embodiment of FIG. 1 has been described in connection with the case where the outer periphery formed by the bases of the five movable pieces is pentagonal when their vertices have been brought into agreement with the axis 0, but this is also applicable to the case where the abovesaid outer periphery is polygonal, and the general conditional expressions become as follows:

$$\frac{\sin\alpha_2}{\sin\alpha_1} \cdot \frac{\sin\alpha_4}{\sin\alpha_3} \cdots \frac{\sin\alpha_{2n}}{\sin\alpha_{2n-1}} = 1 \tag{8}$$

$$\alpha_{2i-1} + \alpha_{2i} + \alpha_i = 180° \tag{9}$$

where $i = 1, 2, \ldots n$, and $$\Sigma\beta_i = 360° \tag{10}$$

where $i = 1, 2, \ldots n$.

As is apparent from the aforesaid expressions (1) to (4), once the amount of movement of one movable piece along its base, for example, $d_1$, is determined by setting the angles of the respective triangular movable pieces, the amounts of movement of the other movable pieces $d_2$, $d_3$, $\ldots d_n$ are determined accordingly. Now, a discussion will be given of the degree of freedom in the determination of the respective angles.

As will be appreciated from the expressions (8), (9) and (10), in the case of forming an n-gonal aperture, the number of angles $\alpha_1 \ldots \alpha_{2n}$, $\beta_1 \ldots \beta_n$ which define the configuration of each movable piece is 3n and, as conditional expressions, the expression (8) is 1, the expression (9) is n and the expression (10) is 1; namely, a total of $n+2$ expressions exist. Accordingly, the degree of freedom in the selection of angles in this case is $3n - (n+2) = 2(n-1)$.

The relationship of the configuration and area of the aperture 11 thus obtained to the configuration and area of the polygon which is obtained by bringing the vertices of the plurality of movable pieces forming the aperture 11 into agreement with the axis 0 is extremely complicated in the case of an ordinary polygon and lacks generality in terms of analysis; hence, this relationship will hereinbelow be described in connection with a regular triangle.

Figure 2:
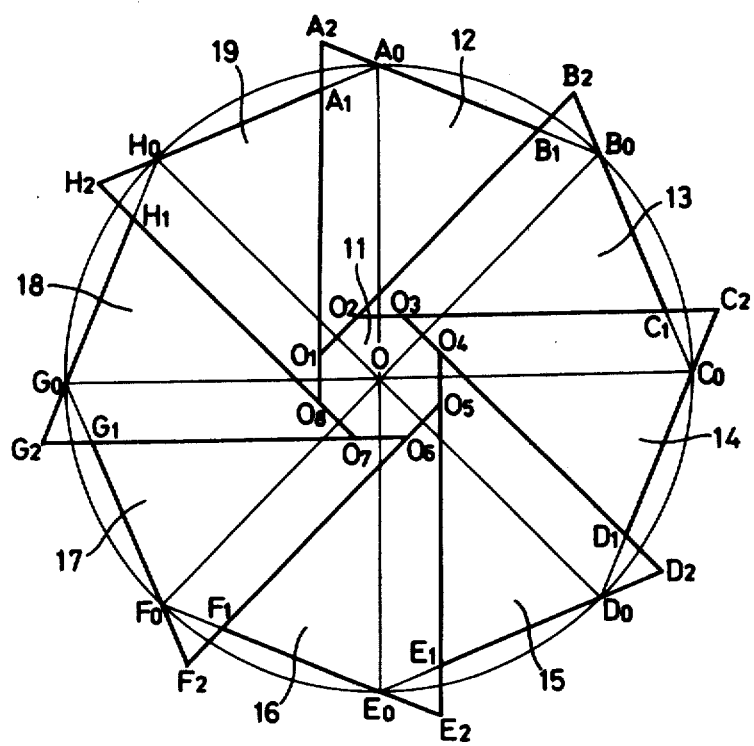
FIG. 2 is a diagram showing the principles of the aperture setting device of the present invention in the case of using movable pieces of the same isosceles triangular configuration.

FIG. 2 illustrates an arragnement wherein the polygon formed by bringing the vertices of respective triangular movable pieces into agreement with the axis 0 is a regular polygon; in this case, each movable piece is a congruent triangle. Further, there is shown a state in which a regular polygonal aperture 11 is formed by moving movable pieces 12, 13, 14, $\ldots$ 18 and 19 forming the abovesaid positions thereof along their bases respectively by an equal predetermined distance $d(=A_0A_2=B_0B_2=C_0C_2 \ldots =G_0G_2=H_0H_2)$.

In FIG. 2, in the case of the movable piece 12, since $\triangle A_0B_0 0 \equiv \triangle A_2B_10$, $A_20_1 = A_00$, and since the movable pieces 12 has been moved along its base $A_2B_1$, $A_20_1 //A_00$, it follows that $\overline{A_0A_2} = d = \overline{00_1}$. From similar considerations of each of the movable pieces 13, 14, 15, 16, 17, 18 and 19, it will be evident that $\overline{00_2} = \overline{00_3} = \overline{00_4} = \overline{00_5} = \overline{00_6} = \overline{00_7} = \overline{00_8} = d$. Accordingly, it is seen that an octagon $0_10_20_30_40_50_60_70_8$ formed by the aperture 11 is a regular octagon inscribed in a circle with a radius d. That is, by moving the movable pieces 12 to 19 along their bases, it is possible to change the size of the aperture 11 while holding the regular octagon. The embodiment of FIG. 2 shows the case where the individual movable pieces gather about the axis 0 to define the regular octagon; but it will easily be understood that the structure of this embodiment can generally be applied to regular polygonal apertures.

In general, if the radius of the circle in which is inscribed the original regular n-gon formed by n isosceles triangular movable pieces with their vertices in agreement with the axis 0 is taken as R, and if the vertical angle formed by the isosceles of each movable piece is taken as $\phi$, then the area S of a regular n-gon formed by the n isosceles triangular movable pieces with their vertices lying in agreement with the axis 0 is given by the following expression:

$$S = nR^2 \sin\frac{\phi}{2} \cos\frac{\phi}{2} \cdot = nR^2 \sin\frac{\pi}{n} \cos\frac{\pi}{n} \tag{11}$$

where n=3, 4, 5 ....

As discussed above, the area s of the aperture defined around the axis 0 is given by the following expression:

$$s = nd^2 \sin\frac{\pi}{n} \cos\frac{\pi}{n} \tag{12}$$

Accordingly, the area ratio between the regular n-gon defined by the movable pieces around the axis 0 and a regular n-gon forming a similar aperture is given by the following expression:

$$\frac{s}{S} = \left(\frac{d}{R}\right)^2 \tag{13}$$

Accordingly, for the formation of regular n-gonal apertures such that the value of the radius r of the circle in which each aperture is inscribed ranges from $r_1$ to $r_2$ ($r_2 > r_1$) it is evident that it is sufficient to set $A_0A_2 = B_0B_2 \ldots G_0G_2 = H_0H_2$ in FIG. 2 so that $r_2/\cos(\#/n)$ may be included in a maximum value of the amount of movement of each moveable piece along its base. In the case of obtaining a similar figure of a desired area ratio given by the expression (13), it is sufficient that R given by the length of equal sides of each movable piece and the amount of movement d of the movable piece along its base are set to predetermined values that satisfy the expression (13).

Figure 3:
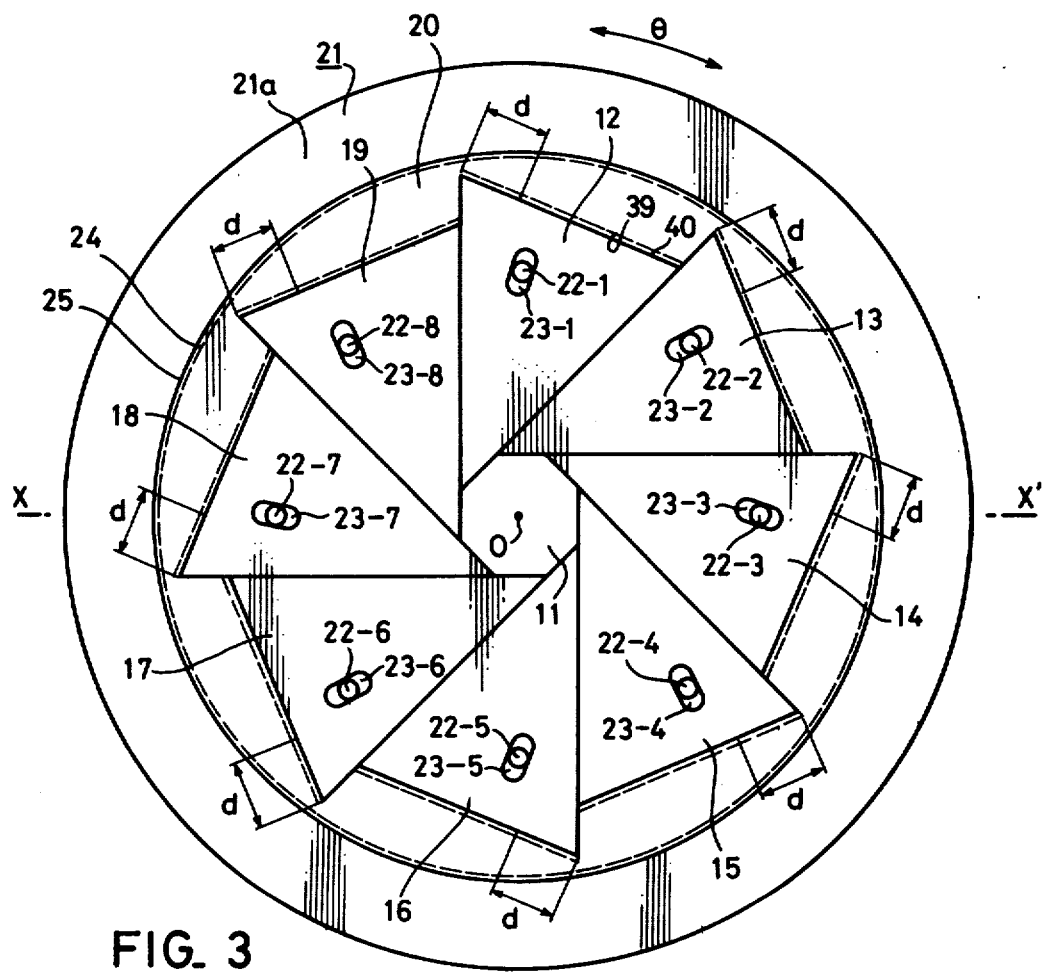
FIG. 3 is a plan view illustrating the arrangement of an embodiment of the aperture setting device of the present invention.
Figure 10:
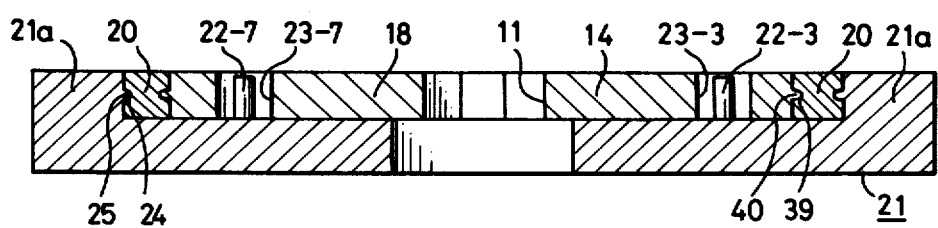
FIG. 10 is a sectional view taken on the line XX' in FIG. 3.

FIG. 3 and FIG. 10 embody the principles of the aperture setting device of the present invention and depict the state in which movable pieces 12, 13, 14, ... 19 around the axis 0 have respectively been moved along their bases by the aforesaid maximum distance d. In this state, the movable pieces 12 to 19 are disposed in a circular frame 20. The inner peripheral configuration of the frame 20 conforms substantially to a windmill-like outer peripheral configuration formed by the movable pieces 12 to 19 as a whole. The movable pieces 12 to 19 are each arranged to be movable to the base thereof in the frame 20 under such a condition as mentioned above. As occasion demands, a guide groove 39 is cut in the inner peripheral surface of the frame 20 to extend in its circumferential direction, and an elongated projection 40 which is movable along the guide groove 39 is formed as a unitary structure with each movable piece. This prevents the movable pieces 12 to 19, when moved, from getting out of the frame 20. As drive means, a guide base 21 is provided, on which the movable pieces 12 to 19 and the frame 21 are mounted. The arrangement is such that, by turning the frame 20 and the guide base 21 about the axis 0 relative to each other, the area of the aperture 11 can be set to a desired value. For example, (n=8) drive pins 22-1, 22-2, ... 22-7 and 22-8 are planted on the guide base 21 at regular intervals on the same circle about the axis 0. The movable pieces 12 to 19 respectively have cut therein elongated holes 23-1 to 23-8 to extend substantially perpendicularly to their bases, and the drive pins 22-1 to 22-8 are respectively inserted in the elongated holes 23-1 to 23-8. Turning the guide base 21 about the axis 0 clockwise in FIG. 3 relative to the frame 20, the drive pins 22-1 to 22-8 move on the same circle about the axis 0 relative to the frame 20. The drive pins 22-1 to 22-8 drive the movable pieces 12 to 19 through the elongated holes 23-1 to 23-8, respectively, by which the movable pieces are moved along their bases to approach the axis 0. In this driving, the vertical distance between each drive pin and the base of the movable piece corresponding thereto varies, but this variation is absorbed by the relative movement in the elongated hole of the movable piece in its lengthwise direction.

Accordingly, with the aperture setting device of FIG. 3 in which the aperture 11 is regular polygonal, the aperture can easily be varied into similar figures with a desired area ratio by presetting the correspondence between the aforementioned movement d and the rotational angle $\theta$ of the guide base 21.

If necessary, on the guide base 21 is formed integrally therewith a ring-shaped guide projection 21a adjacent the outer peripheral surface of the frame 20; a ring-shaped groove 24 is cut in the outer peripheral surface of the frame 20 to extend along the peripheral surface thereof; and a ring-shaped projection 25 fitted in the ring-shaped groove 24 is formed integrally with the inner peripheral surface of the ring-shaped guide projection 21a. This prevents the frame 20 from getting out of the guide base 21.

Figure 4A:
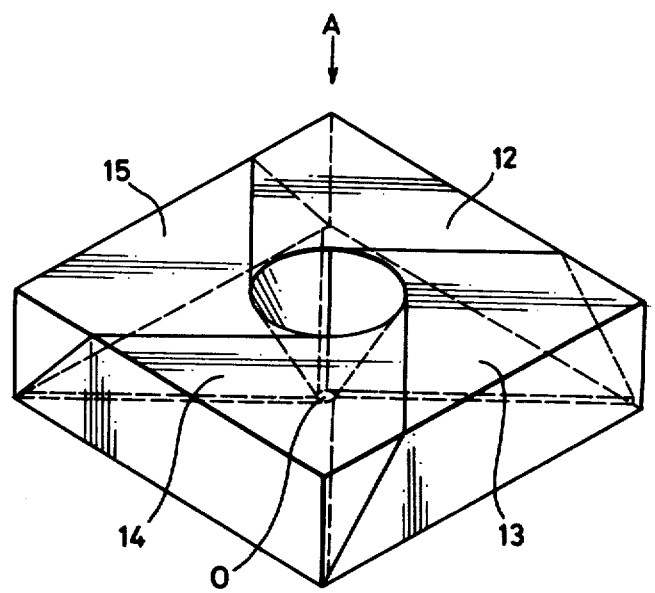
FIG. 4(a) is a perspective view showing how movable pieces are assembled together to provide a conical aperture setting portion in the aperture setting device of the present invention.
Figure 5A:
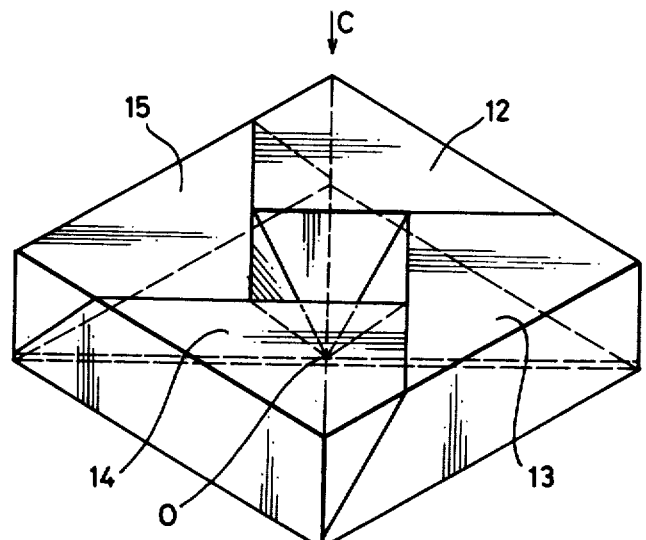
FIG. 5(a) is a perspective view showing how movable pieces are assembled together to provide a quadrangular pyramidal aperture setting portion in the aperture setting device of the present invention.
Figure 6A:
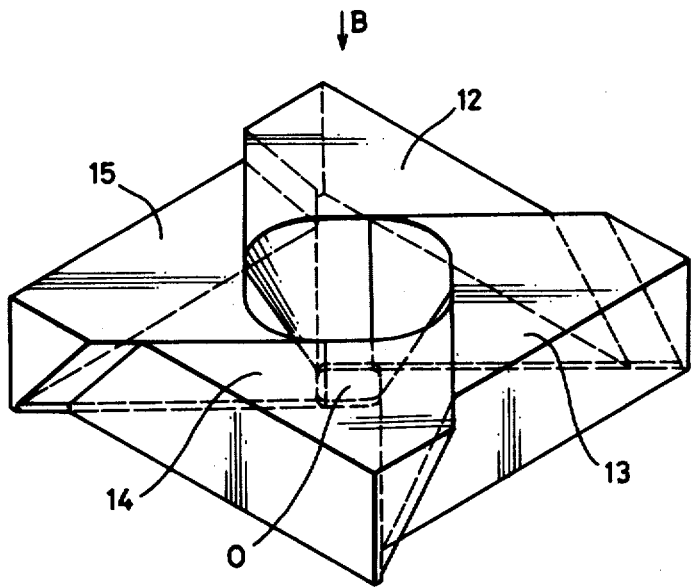
FIG. 6(a) is a perspective view showing the state in which the aperture of the aperture setting portion is opened in FIG. 4(a)
Figure 6B:
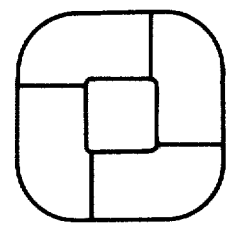
FIG. 6(b) is a plan view of the aperture setting portion in the state of FIG. 6(a)
Figure 7A:
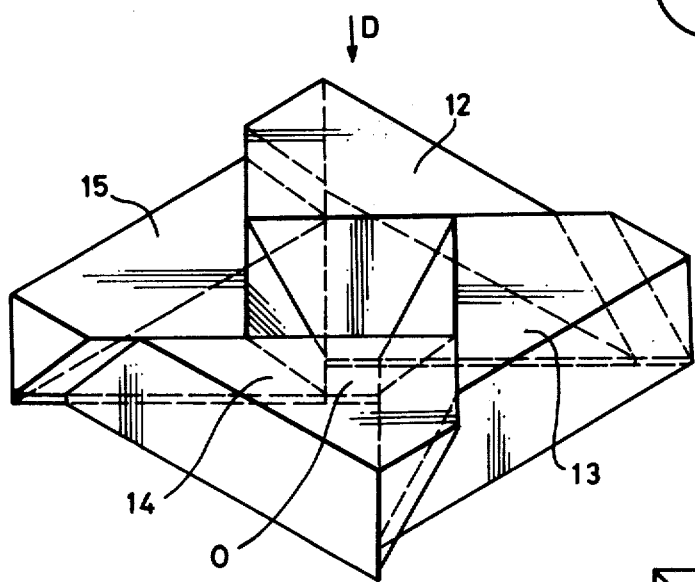
FIG. 7(a) is a perspective view showing the state in which the aperture of the aperture setting portion is opened in FIG. 5(a)

In the above description, the configurations of the movable pieces 12 to 19 are configurations in the plane perpendicular to the axis 0, as referred to previously. The plane in which each side of each movable piece extends along the axis 0, that is, the inner peripheral surface of the aperture, need not always be parallel with the axis 0. Further, the cross-sectional shape of the movable piece is not necessarily always triangular but may vary at different positions along the axis 0. Next, a description will be given of movable pieces of various different configurations. FIGS. 4, 5, 6 and 7 show various modified forms of the movable piece, and it will be apparent that various other modifications are possible. In FIGS. 4 and 6, the aperture setting portion is made truncated-conical about the axis 0. FIG. 4(a) shows the state in which the aperture is closed by gathering movable pieces around the axis 0 and FIG. 6(a) the state in which the aperture is opened. In FIGS. 5 and 7, the aperture setting portion is made quadrangular-pyramidal. FIG. 5(a) shows the state in which the aperture is closed and FIG. 7(a) the state in which the aperture is opened.

Figure 4B:
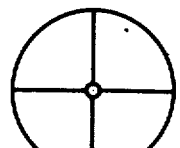
FIG. 4(b) is a plan view of the aperture setting portion in FIG. 4(a)
Figure 4C:
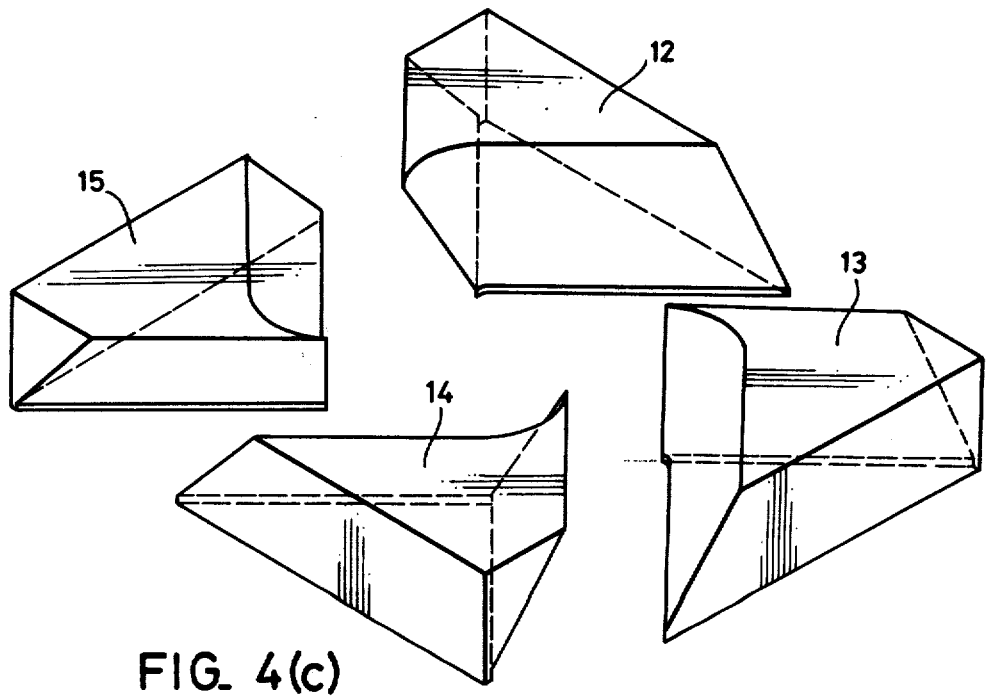
FIG. 4(c) is an exploded perspective view showing the individual movable pieces in FIG. 4(a)

In the embodiment of FIG. 4, as shown in FIG. 4(a), movable pieces 12 to 15 are disposed around the axis 0, the bottom of each movable piece is triangular and the movable piece is adapted to be movable along the triangular base. When the movable pieces 12 to 15 are gathered around the axis 0, the inner peripheral surface forms a truncated cone with its vertex at the axis 0. The dimensions of the truncated cone, that is, the areas of its base and top vary with the movement of the movable pieces 12 to 15 along their triangular bases. The shape of the aperture setting portion, as viewed from the direction of the axis 0, is circular, as depicted in FIG. 4(b), and the configurations of the movable pieces 12 to 15 are such as shown in FIG. 4(c). That is, as shown in FIG. 4(a), the tops of the movable pieces 12 to 15 are formed to provide a square identical with the square outer periphery which is formed by gathering the triangular bottoms of the movable pieces around the axis O to close the aperture, but those of side walls of the movable pieces which form the inner peripheral surface of the aperture setting portion are inclined so that they form the truncated cone with its vertex at the axis O. Accordingly, when the aperture is closed, as depicted in FIG. 4(a), the aperture setting portion is conical, as shown in FIG. 4(b); and, when the aperture is opened, the aperture setting portion is truncated-conical. The inclined side wall of each movable piece is extended on the same plane to form a slide surface for the adjoining movable piece.

Figure 5B:
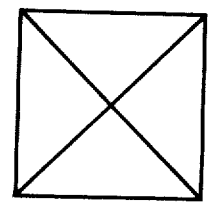
FIG. 5(b) is a plan view of the aperture setting portion in FIG. 5(a)
Figure 5C:
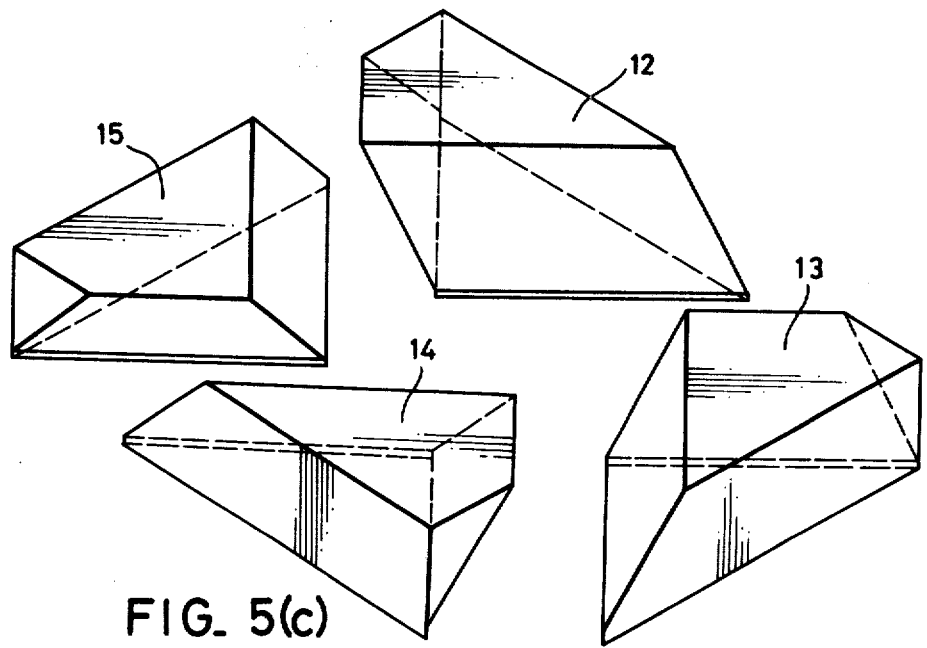
FIG. 5(c) is an exploded perspective view showing the individual movable pieces in FIG. 5(a)
Figure 7B:
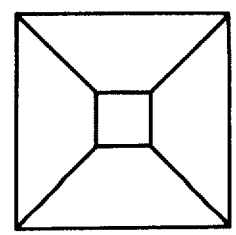
FIG. 7(b) is a plan view of the aperture setting portion in the state of FIG. 7(a)

The embodiment of FIG. 5 is constructed so that in the state of the aperture is closed, the aperture setting portion defined by the movable pieces 12 to 15 forms a quadrangular pyramid about the axis O, as shown in FIG. 5(a). In this case, the configuration of the aperture setting portion, as viewed from the direction of the arrow C in FIG. 5(a), that is, from the side of the opening end of the aperture setting portion, is square, as shown in FIG. 5(b), and the movable pieces 12 to 15 respectively have the configurations illustrated in FIG. 5(c) in which their bottoms are triangular and their tops parallel to the bottoms are quadrangular. Accordingly, when the aperture is closed, as shown in FIG. 5(a), the aperture setting portion forms a quadrangular pyramid as depicted in FIGS. 5(a) and 5(b), whereas when the aperture is opened as shown in FIG. 7(a), the aperture setting portion forms a truncated quadrangular pyramid, as illustrated in FIGS. 7(a) and 7(b).

Figure 8:
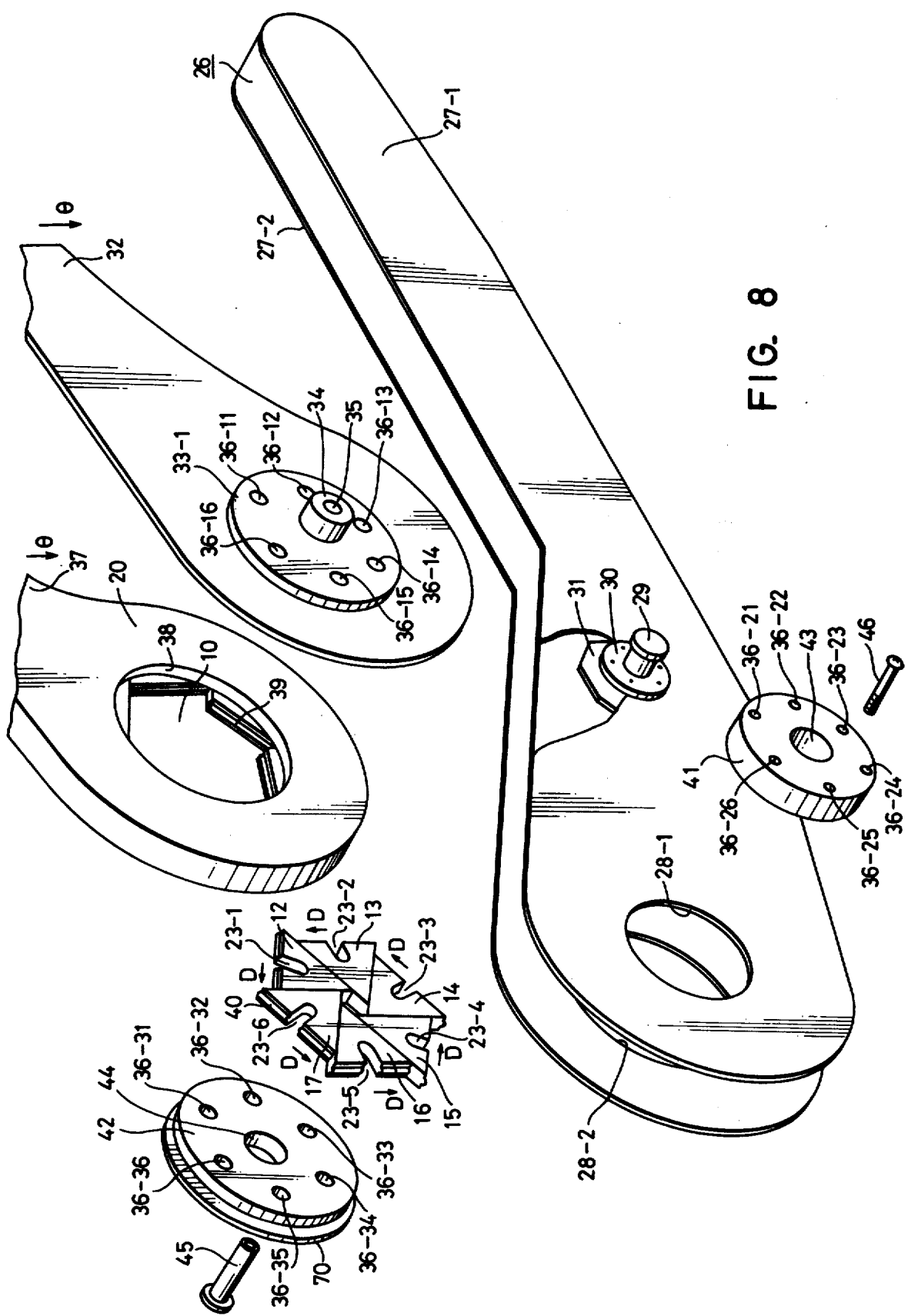
FIG. 8 is an exploded perspective view illustrating the construction of a manual forming and pressing tool embodying the present invention.

FIG. 8 is an exploded diagram illustrating an embodiment of the aperture setting device of the present invention as used in a manual forming and pressing tool. A description will be given of how respective parts shown are assembled into the manual forming and pressing tool.

A fixed handle 26 is composed of a pair of parallel spatular side plates 27-1 and 27-2 coupled together by coupling pieces, each formed one one part of the marginal edge of each side plate in its lengthwise direction. The side plates 27-1 and 27-2 are wide at one end portion and narrow at the other end portion, and the wide end portions have centrally disposed circular holes 28-1 and 28-2 of the same diameter. A wide end portion of a movable handle 37 has formed integrally therewith, at the center thereof, the frame 20 described previously in respect of FIG. 3 and FIG. 10, and in the frame 20 are mounted movable pieces 12 to 16 and 17 in a manner to be movable along their bases by a predetermined distance, as indicated by the arrows D. As described previously, it is also posssible to adopt an arrangement in which a guide groove 39 is cut in the inner peripheral surface of the frame and a projection 40 for engagement with the guide groove 39 is formed on the surface of each movable piece on the side of its base. The frame 20 having thus mounted therein the plurality of movable pieces 12 to 17 is interposed between the wide end portions of the two side plates 27-1 and 27-2 of the fixed handle 26, and a narrow grip of the movable handle 37 formed at the other end portion thereof and a grip of the fixed handle 26 are placed opposite each other. The movable handle 37 and the fixed handle 26 are designed so that they can turn about the axis of the frame 20 relative to each other, and the movable pieces 12 to 17 are moved by the relative rotational movement of the handles 37 and 26.

To this end, a support disc 42 is fitted into the circular hole 28-2 of the side plate 27-2 of the fixed handle 26, and a flange 70 formed integrally with the peripheral surface of the support disc 42 serving as a driving member is urged against the outside of the side plate 27-2. The frame 20 has formed therein on the side of the side plate 27-2 a circular recess coaxial with the frame 20, though not shown in FIG. 8, and the support disc 42 is fitted into this circular recess.

A setting piece 32 for setting the opening of the aperture is interposed between the frame 20 and the side plate 27-1. Circular projections 33-1 and 33-2 coaxial with the frame 20 are formed integrally with the setting piece 32 on both sides thereof. In FIG. 8, the circular projection 33-2 is behind the setting piece 32 and hence is not illustrated. A circular recess 38, which is coaxial with the frame 20, is formed in the frame 20 in opposing relation to the setting piece 32, and the circular projection 33-2 is fitted into the circular recess 38. The circular projection 33-1 is fitted into the circular hole 28-1 of the side plate 27-1. A sleeve 34 is formed integrally with the circular projection 33-1 at the position of its axis.

A support disc 41 larger than the circular hole 28-1 is placed on the outside of the side plate 27-1 to cover the hole 28-1. The support disc 41, used as a driving member, has formed centrally thereof a hole 43, into which the sleeve 34 of the setting piece 32 is inserted. The setting piece 32 and the support discs 41 and 42 respectively has formed therethrough small holes 36-11 to 36-16, 36-21 to 36-26 and 36-31 to 36-36 corresponding to the elongated holes 23-1 to 23-6 of the movable pieces 12-16. Drive pins 45 are individually inserted into corresponding ones of the abovesaid small holes and the elongated holes from the outside of the support disc 42. The pins 45 have each formed integrally therewith a flange surrounding the outer end face to serve as a stopper, and the inner end face of each pin 45 has formed therein a threaded hole. A screw 46 is screwed into the threaded hole of each pin 45 from the outside of the support disc 41 through the abovesaid small holes and the elongated hole.

In this way, the fixed handle 26, the movable handle 37 and the setting pice 32 are coupled together, but the movable handle 37 is rotatable relative to the fixed handle 26. Bringing the grips of the fixed handle 26 and the movable handle 27 close to each other, the setting piece 32 also turns but butts against the fixed handle 26 when a set angle is reached, and further rotational movement of the setting piece 32 is limited, and consequently the pins 45 are fixed. Bringing the grips of the handles 26 and 37 closer to each other, the pins 45 move in the elongated holes 23-1 to 23-6 to move the movable pieces 12 to 17 in the frame 20, reducing the aperture defined by the movable pieces 12 to 17.

Furthermore, this embodiment is designed so that the aperture can be set at a plurality of stages. To perform this, an adjust disc 30 having a knob 29 is mounted on the outside of the side plate 27-1 substantially centrally thereof. The shaft of the adjust disc 30 is inserted into a hole made in the side plate 27-1 and its projecting end has mounted thereon and adjust cam 31. The marginal portion of the setting piece 32 on the side of the coupling pieces of the side plates 27-1 and 27-2 confronts the cam surface formed in the peripheral surface of the adjust cam 31. The knob 29 is arranged to be rotatable for switching to a plurality of stages, and the cam 31 is formed so that the distance between the cam surface of the adjust cam 31 confronting the setting piece 32 and the shaft of the adjust cam 31 changes with the switching position set up by the knob 29.

The angle between the setting piece 32 and the fixed handle 26 does not become smaller than the angle therebetween when the setting piece 32 butts against the cam 31, and at that angle the rotational movement of the setting piece 32 is stopped. A minimum angle between the fixed handle 26 and the setting piece 32 can be altered by the set position of the adjust disc 30. Since the opening of the aperture is determined by the amount by which the movable handle 37 can be turned closer to the fixed handle 26 from the position where the setting piece 32 has been halted, as described previously, the opening of the aperture can be set by the set position of the adjust disc 30.

Accordingly, a hole 35 is made in the sleeve 34 which is inserted into the hole of the support disc 41 and the hole 35 is formed to extend through the setting piece 32 and, further, a hole 44 is also formed in the support disc 42 to extend therethrough in alignment with the hole 35. In the state in which the handles 26 and 27 have been drawn away from each other to open the aperture, a linear member to be formed, such as an electric wire or the like, is inserted into the hole 35 of the sleeve 34. In this case, the knob 29 of the adjust disc 30 is preset to a predetermined position. Next, the movable handle 37 is turned to reduce the angle between it and the fixed handle 26, butting the setting piece 32 against the adjust cam 31 to stop the rotational movement of the setting piece 32. By further rotating the movable cam 37 towards the fixed handle 26, the member to be formed is subjected to a sufficiently large pressure by the movable pieces 12 to 17 and readily formed into a predetermined shape.

Figure 9B:
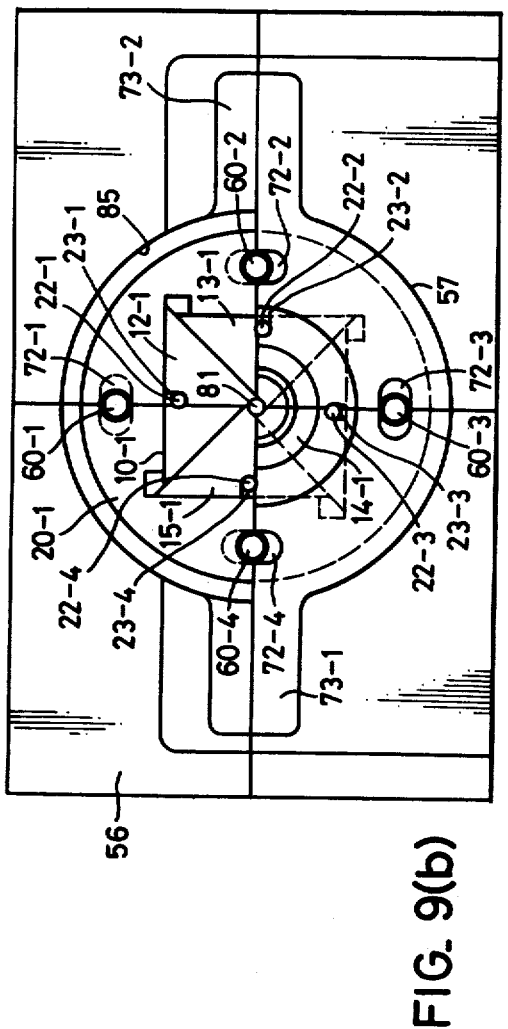
FIG. 9(b) is a sectional view taken on the lines AA' and BB' in FIG. 9(a)
Figure 9C:
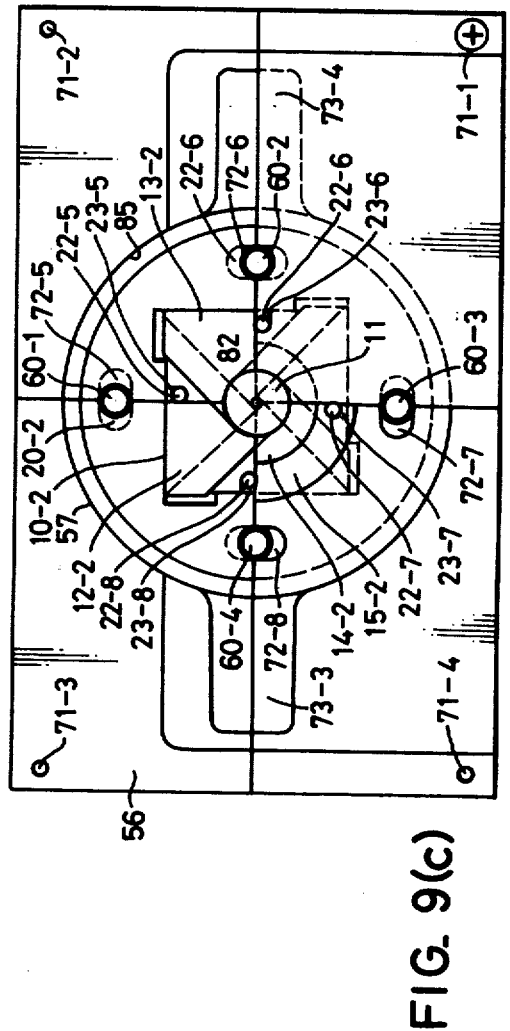
FIG. 9(c) is a sectional view taken on the lines CC' and DD' in FIG. 9(a)
Figure 9A:
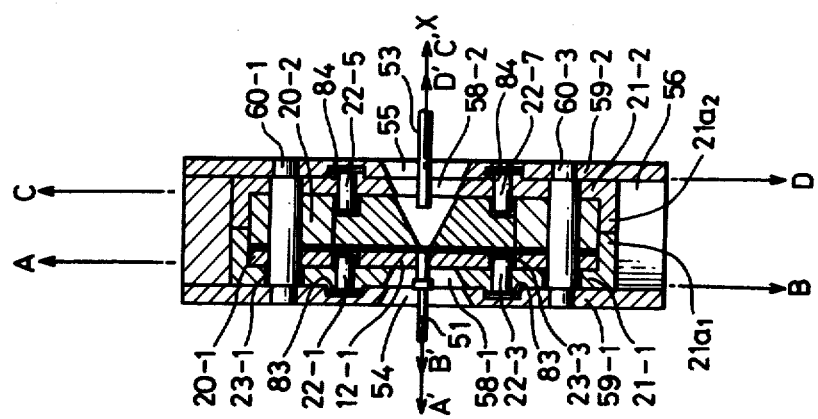
FIG. 9(a) is a sectional view illustrating an electric wire guide device embodying the present invention.

FIG. 9 illustrates another embodiment of the aperture setting device of the present invention as applied to an electric wire guide device. As shown in FIG. 9(a), a pin 51 of a connector and an electric wire 53 are inserted into the aperture setting device through openings 54 and 55 formed in left- and right-hand side panel 59-1 and 59-2 of a rectangular parallelepiped casing, and the pin 51 and the wire 53 are brought into alignment with each other. In the casing, guide bases 21-1 and 21-2 serving as drive means, which are similar to the guide base 21 described previously in connection with FIGS. 3 and 10, are respectively disposed on the insides of the left- and right-hand side panels 59-1 and 59-2, with end faces of their ring-shaped projecting portions 21a1 and 21a2 held in contact with each other, and frames 20-1 and 20-2 are disposed inside the ring-shaped projecting portions 21a1 and 21a2. The frame 20-2 partly extends into the space defined by the ring-shaped projecting portion 21a1. Further, as shown in FIGS. 9(a), 9(b) and 9(c), two sets of four movable pieces 12-1 to 15-1 and 12-2 to 15-2 are respectively fitted into the frames 20-1 and 20-2. The guide base 21-1 has planted thereon drive pins 22-1 to 22-4, which are respectively inserted into elongated holes 23-1 to 23-4 of the movable pieces 12-1 to 15-1. Similarly, the guide base 21-2 has planted thereon drive pins 22-5 to 22-8, which are inserted into elongated holes 23-5 to 23-8 of the movable pieces 12-2 to 15-2.

The movable pieces 12-1 to 15-1 are so formed as to provide a pyramidal aperture setting portion 81, whereas the movable pieces 12-2 to 15-2 are so formed as to provide a truncated, quadrangular pyramidal aperture setting portion 82. The axes of the aperture setting portions 81 and 82 lie on the same straight line, which is substantially in alignment with the centers of the openings 54 and 55 of the side panels of the casing. Further, the guide bases 21-1 and 21-2 respectively have centrally disposed through holes 58-1 and 58-2 which are substantially aligned with the openings 54 and 55, respectively.

The aperture setting device of this embodiment is designed so that the sizes of both aperture setting portions can be controlled concurrently by turning the guide bases 21-1 and 21-2 relative to the frames 20-1 and 20-2 at the same time. For example, the side panels 59-1 and 59-2 are each connected at their marginal portions except one side thereof to a U-shaped coupling member 56 and fixedly secured thereto as by screws 71-1 to 71-4. Consequently, there is formed a casing in which the coupling member 56 has an open end downwardly in FIG. 9(a). Support pins 60-1 to 60-4 which pass through the side panels 59-1, the guide base 21-1, the frames 20-1, 20-2 and 21-2 and the side panel 59-2 in this order are provided about the aperture at equiangular intervals. The support pins 60-1 to 60-4 are each reduced in diameter at both ends thereof to form stepped portions. The length of each support pin between the stepped portions limits the distance between the two side panels 59-1 and 59-2 to define a space large enough for the guide bases 21-1 and 21-2 to rotate in the casing. The support pins 60-1 to 60-4, the side panels 59-1 and 59-2 and the frames 20-1 and 20-2 are snugly fitted into an insertion hole, and the frames 20-1 and 20-2 are fixed to the side panels 59-1 and 59-2 through the support pins 60-1 to 60-4. In this case, however, holes 72-1 to 72-4 and 72-5 to 72-8 of the guide bases 21-1 and 21-2, through which the support pins 60-1 to 60-4 pass, are each cut in the form of a short circular arc centering about the axis of the aperture setting portion. From the peripheral surfaces of the guide bases 21-1 and 21-2 respectively project drive pieces 73-1, 73-2 and 73-3, 73-4 on the apposite side from the aperture setting portion. Pressing the one pair of drive pieces 73-1 and 73-4 from the open end of the casing, the guide base 21-1 turns clockwise in FIG. 9(b) and the guide base 21-1 turns counterclockwise in FIG. 9(c). At this time, since the frames 20-1 and 20-2 are fixed to the side panels 59-1 and 59-2, as referred to previously, and do not move, the movable pieces 12-1 to 15-1 and 12-2 to 15-2 housed in the frames 20-1 and 20-2 respectively move along their bases, thereby enlarging both apertures 81 and 82. Conversely, by pressing the drive pieces 73-2 and 73-3, both apertures 81 and 82 are reduced.

Accordingly, in the state in which the pyramidal aperture 81 has been enlarged by pressing the movable pieces 73-1 and 73-4, the connector pin 51 is inserted into the enlarged aperture 81 through the opening 54, and thereafter drive pieces 73-2 and 73-3 are pressed to reduce the aperture 81, causing the movable pieces 12-1 to 15-1 to hold the connector pin 51. Next, after enlarging the aperture 82 by pressing the drive piece 73-4 on the side of the electric wire 53, the electric wire 53 is guided into the aperture 82 through the opening 55 and then the aperture 82 is reduced by pressing the drive piece 73-3, by which the electric wire 53 can easily be inserted into a hole of the connector pin 51, with the axis of the former held accurately in alignment with the latter. In this case, the range of the rotational movement of the guide bases 21-1 and 21-2 is limited by the short, arcuate holes 72-1 to 72-4, thereby to provide proper maximum and minimum values of the apertures 81 and 82. In FIG. 9(a), the pins 22-1 to 22-4 and 22-5 to 22-8 slightly jut out towards the side panels 59-1 and 59-2, respectively. In order to projecting ends of the pins 22-1 to 22-4 and 22-5 to 22-8, shallow, ring-shaped grooves 83 and 84 are formed in the side panels 59-1 and 59-2. A circular recess 85 is formed in the inner surface of the intermediate portion of the U-shaped, side panel coupling member 56 and the outer peripheral surfaces of the guide bases 21-1 and 21-2 are partly fitted into the recess 85 and guided therein.

In the above detailed explanation of the present invention, the holes for receiving drive pins have been described as having the elongated direction of each hole perpendicular to the corresponding base side of a triangle; however, it will be understood that, in principle, it would be enough if the elongated direction of each hole has a directional component perpendicular to the corresponding base side.

As has been described in the foregoing, according to the present invention, by moving a plurality of movable pieces along their triangular bases formed in a plane including an aperture, it is possible to enlarge or reduce the aperture to a similar figure with a predetermined size. Furthermore, the present invention makes it possible to have the configuration of the aperture complicated. Moreover, the present invention is applicable to a press tool for press forming, a drawing die and so forth and hence is of very wide application. In addition, the aperture setting device of the present invention is relatively simple and rigid in structure, easy to manipulate and is able to provide a relatively large pressure.

It will be apparent that many modifications and variations may be effected without departing from the scope of the novel concepts of this invention.

What is claimed is:

1. A center aligning device comprising:
   a first aperture setting means comprising a first frame having a circular outer circumference and inner edges each forming a portion of one side of a polygon, at least three first movable pieces circularly arranged inside said first frame for slideable movement relative to one another and relative to the edges of said first frame in a common plane, each of said first movable pieces being approximately triangular in a plane parallel to said common plane and having an elongated hole formed therein, a portion of one side of each of said first movable pieces forming one side of a first polygonal aperture to be set, and a first drive member disposed opposite one side of the faces of said first movable pieces and having first drive pins thereon, each of said first drive pins being inserted into a corresponding one of said elongated holes of said first movable pieces for simultaneously moving said first movable pieces relative to said first frame to set the size of said first polygonal aperture;
   second aperture setting means for setting a second polygonal aperture, said second aperture setting means comprising a second frame, second movable pieces, and a second drive member arranged in the same manner as those of said first aperture setting means; and
   coupling means for coupling said first and second aperture setting means to one another such that the axis of said first polygonal aperture coincides with the axis of said second polygonal aperture and the movements of said first and second drive members are independent of each other.

2. A center aligning device according to claim 1 wherein each of said first and second frames respectively has a plurality of through holes formed therein, said coupling means comprising a plurality of support pins respectively extending through the through holes of said first and second frames to prevent relative movement between said coupling means and said first and second frames.

3. A center aligning device according to claim 2 wherein said first and second drive members have a plurality of arcuate holes formed therein at the positions corresponding to respective ones of said through holes for receiving said support pins while allowing rotational movements of said first and second drive members.

4. A center aligning device according to claim 3 wherein said coupling means comprises a casing with two parallel side panels for encasing therebetween said first and second aperture setting means, the opposing ends of said supporting pins being fixed respectively into said two side panels.

5. A center aligning device according to any one of claims 1-4 wherein each of said first and second drive members comprises drive piece means extending out therefrom for receiving a drive force.

6. A center aligning device according to any one of claims 1-4 wherein the said elongated hole in each of said first and second movable pieces is a slot cut into the movable piece from one side thereof.

7. A center aligning device according to any one of claims 1-4 wherein said first polygonal aperture set by said first movable pieces is columnar in configuration, and said second polygonal aperture set by said second movable pieces is pyramidal in configuration with its vertex lying on the side of said first polygonal aperture.

* * * * *